(No Model.) 5 Sheets—Sheet 1.
J. CLARET & O. WUILLEUMIER.
ELECTRIC RAILWAY AND TRAMWAY.
No. 544,209. Patented Aug. 6, 1895.
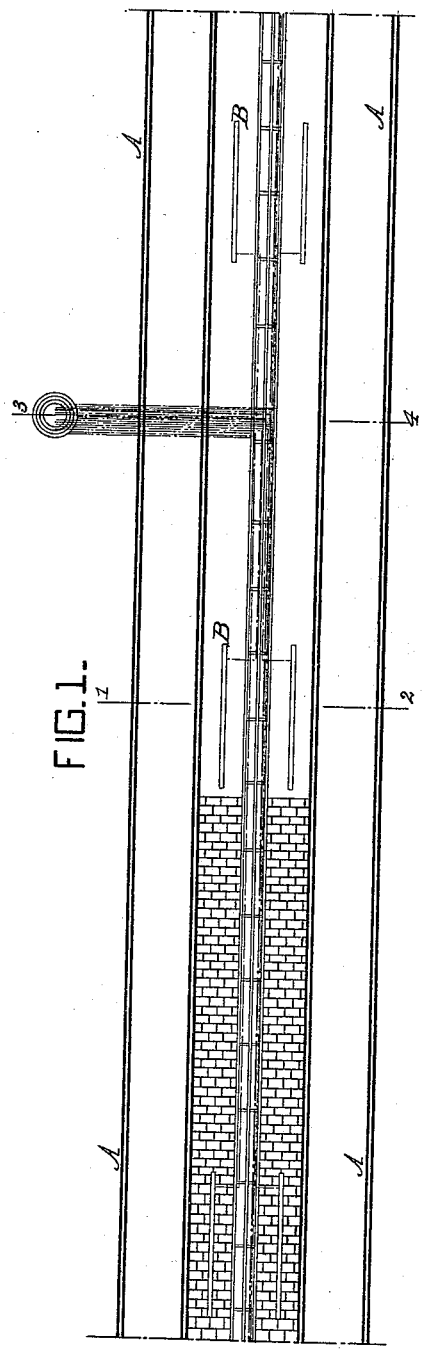
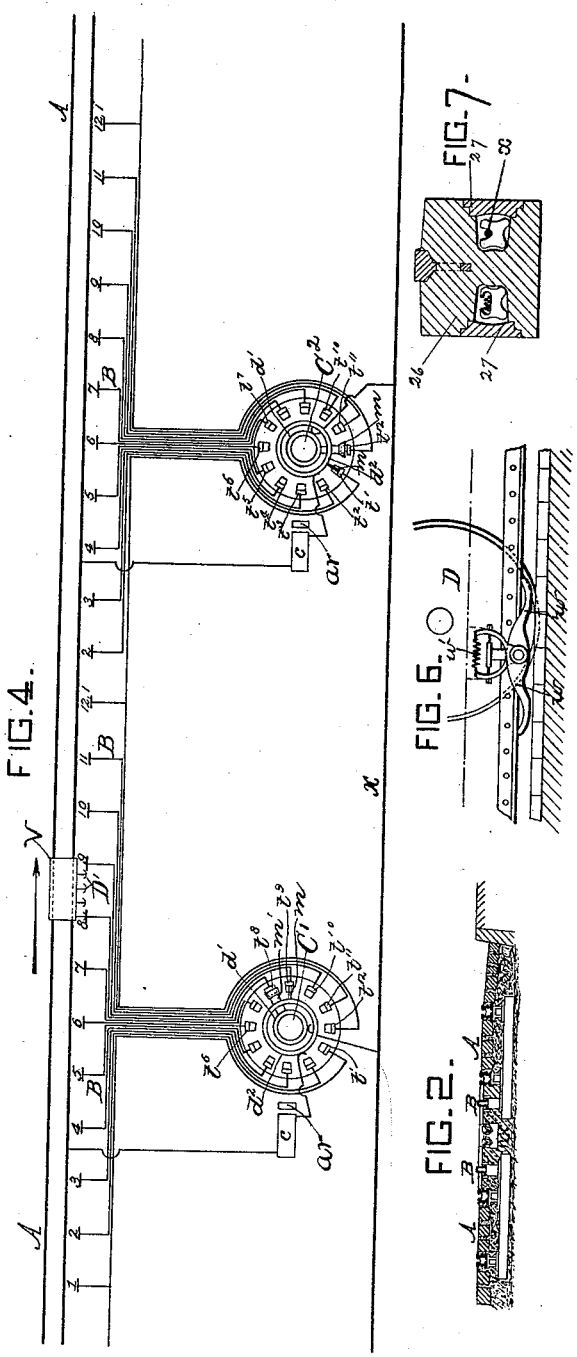
WITNESSES:
George Baumann
S. C. Connor
INVENTORS
Jean Claret
Olivier Wuilleumier
BY Howson and Howson
their ATTORNEYS.

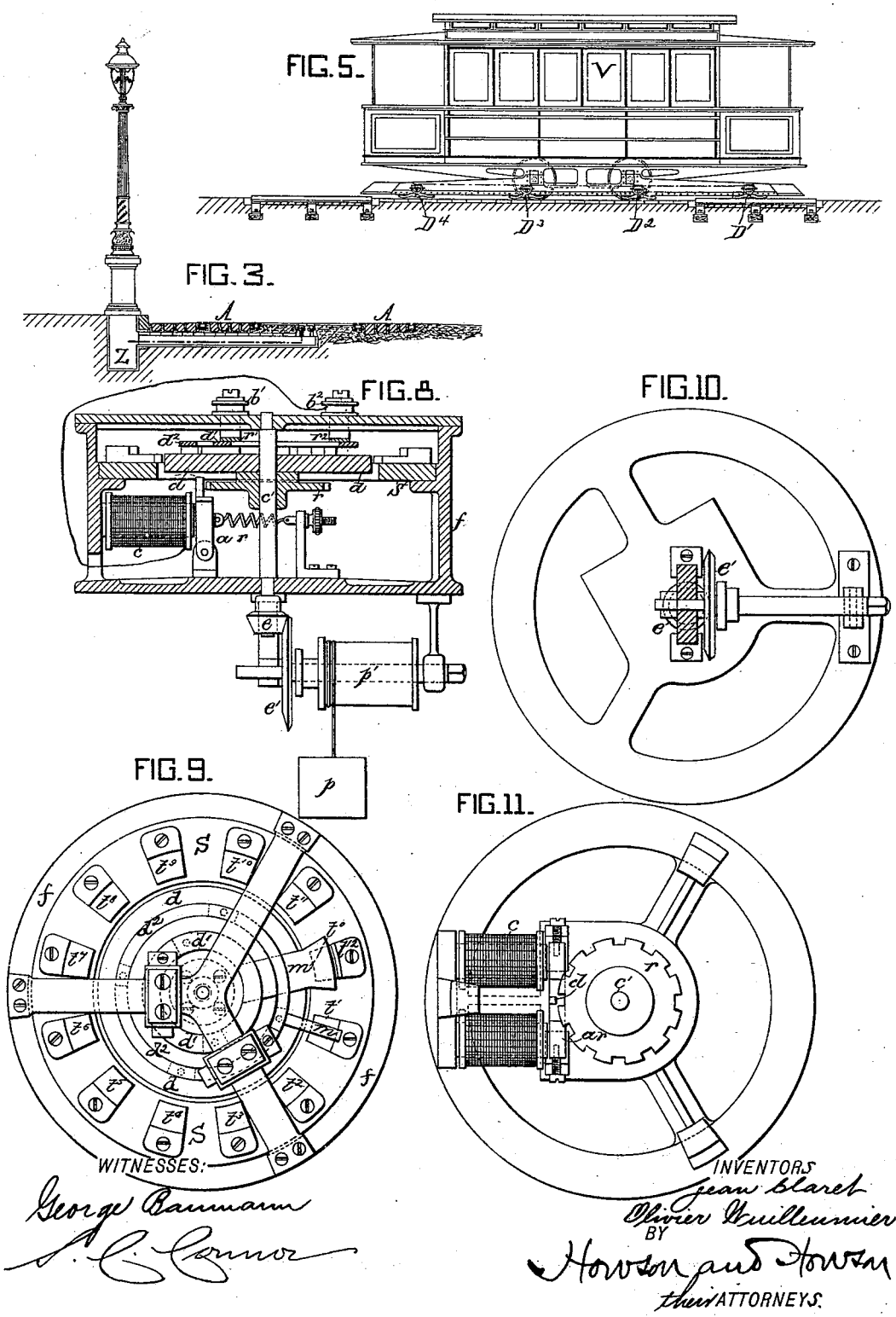

(No Model.) 5 Sheets—Sheet 3.
J. CLARET & O. WUILLEUMIER.
ELECTRIC RAILWAY AND TRAMWAY.
No. 544,209. Patented Aug. 6, 1895.
FIG.15.
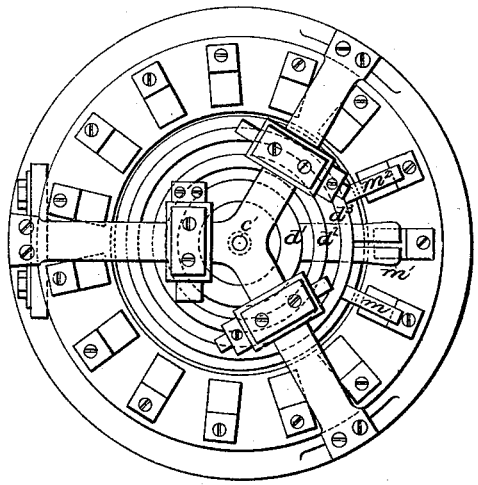
FIG.18. FIG.19.
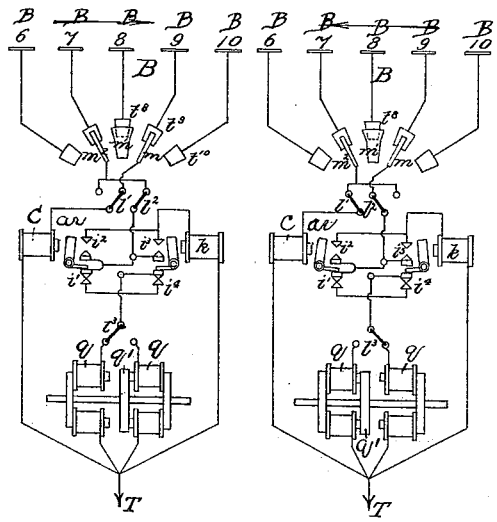
FIG.16. FIG.17.
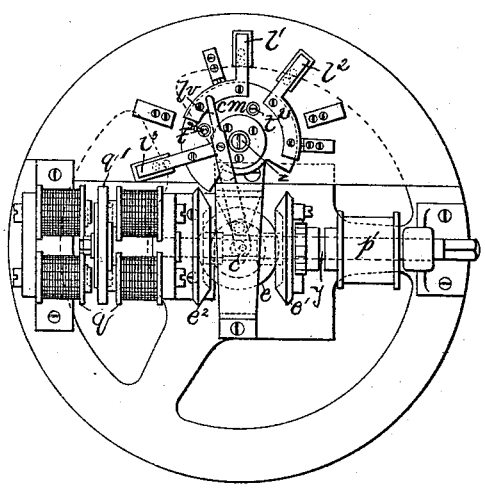
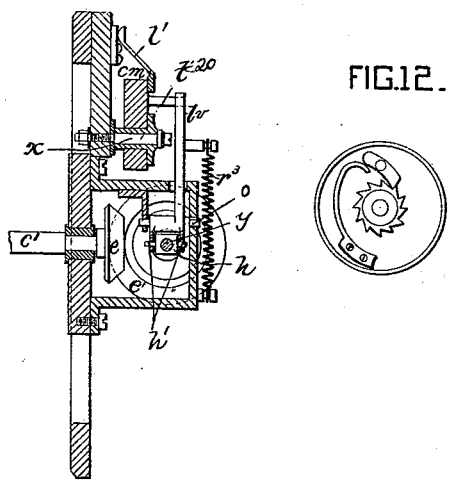
FIG.12.
FIG.13. FIG.14.
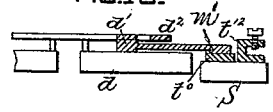
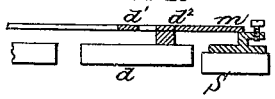
WITNESSES:
George Baumann
S. C. Connor
INVENTORS
Jean Claret and
Olivier Wuilleumier
BY Howson and Howson
their ATTORNEYS.

(No Model.) 5 Sheets—Sheet 4.
J. CLARET & O. WUILLEUMIER.
ELECTRIC RAILWAY AND TRAMWAY.
No. 544,209. Patented Aug. 6, 1895.
FIG. 20.
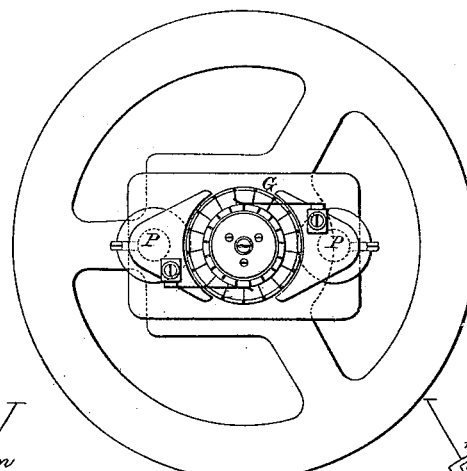
FIG. 21.ª
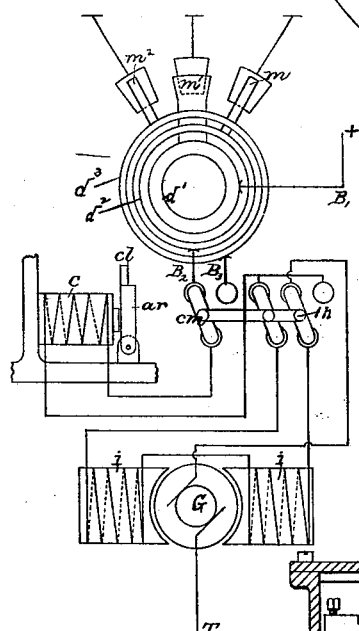
FIG. 21.ᵇ
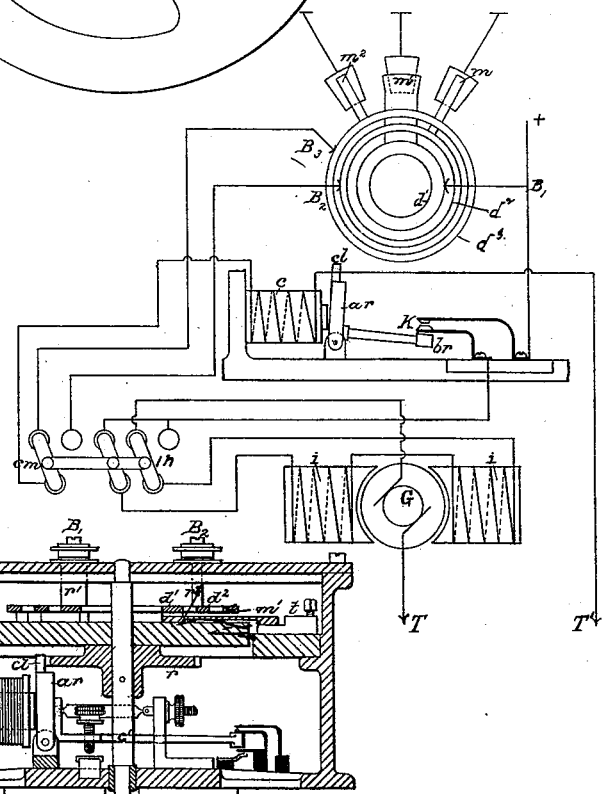
FIG. 21.
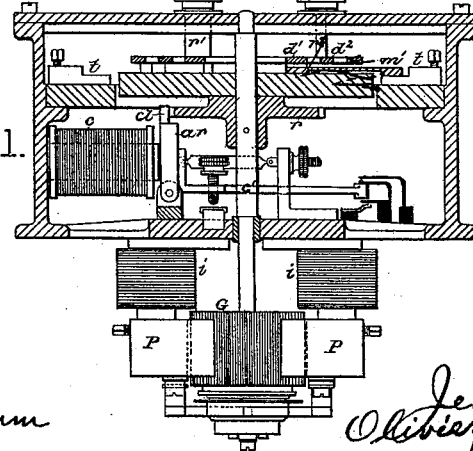
WITNESSES:
George Baumann
J. C. Connor
INVENTORS
Jean Claret
Olivier Wuilleumier
BY Howson & Howson
their ATTORNEYS.

(No Model.) 5 Sheets—Sheet 5.
J. CLARET & O. WUILLEUMIER.
ELECTRIC RAILWAY AND TRAMWAY.
No. 544,209. Patented Aug. 6, 1895.
FIG. 22. FIG. 23.
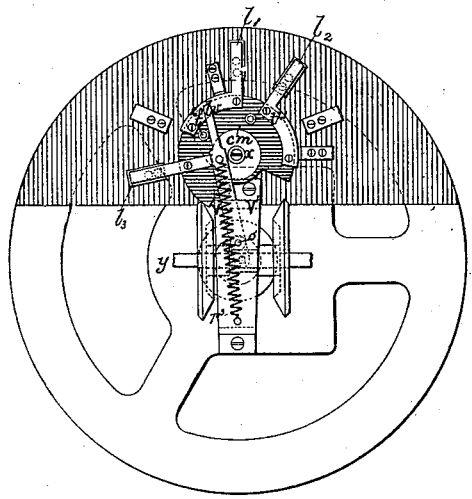 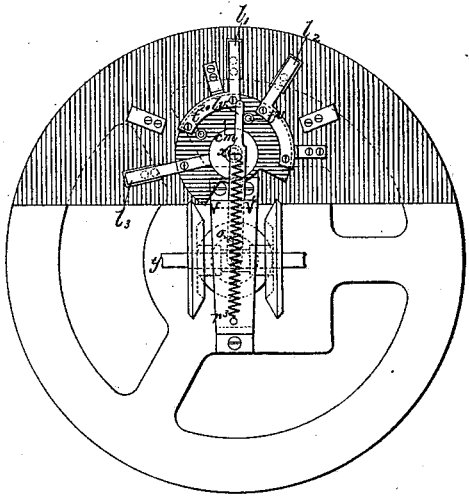
FIG. 24. FIG. 25. FIG. 26.
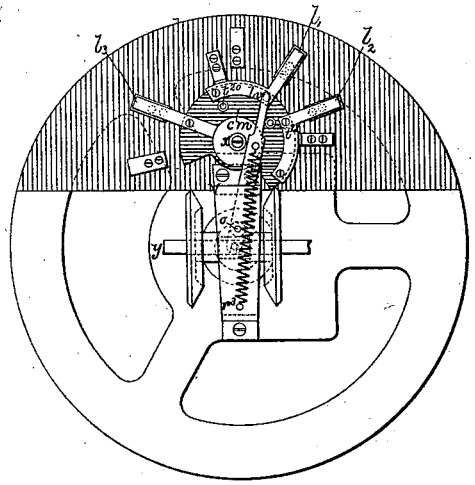 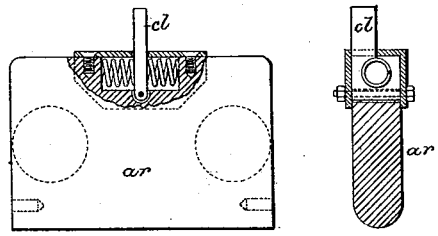
FIG. 27.
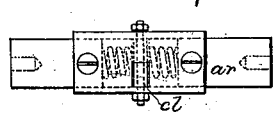
WITNESSES:
George Baumann
INVENTORS
Jean Claret
Olivier Wuilleumier
BY
Howson & Howson
their ATTORNEYS.

UNITED STATES PATENT OFFICE.

JEAN CLARET, OF LYONS, AND OLIVIER WUILLEUMIER, OF CLERMONT-FERRAND, FRANCE.

ELECTRIC RAILWAY AND TRAMWAY.

SPECIFICATION forming part of Letters Patent No. 544,209, dated August 6, 1895.

Application filed July 25, 1893. Serial No. 481,388. (No model.) Patented in France November 3, 1892, No. 228,291, and in England June 2, 1893, No. 10,843.

*To all whom it may concern:*

Be it known that we, JEAN CLARET, a citizen of the Republic of France, residing in Lyons, (Rhône,) and OLIVIER WUILLEUMIER, a citizen of the Republic of Switzerland, residing in Clermont-Ferrand, (Puy-de-Dôme,) France, engineers, have invented certain Improvements in or Connected with Electric Railways and Tramways, (for which we have obtained a French patent November 3, 1892, No. 228,291, and British patent June 2, 1893, No. 10,843,) of which the following is a specification.

This invention relates to electric railways and tramways in which automatic distributers are employed to supply the current to the motors, as hereinafter described.

According to this invention the poles of the dynamos or generator of current are connected on the one hand with the rails of the track, and on the other hand, through a main conductor, with a series of the automatic distributers which are arranged at suitable intervals along the line. From each of these distributers proceed branch or feed wires which are connected to stationary contact-making devices or surfaces situated either between or at the side of the rails at distances apart equal to the length of one vehicle. By the intervention of the automatic distributers these contact-surfaces are placed in communication successively or one by one as the vehicle advances with the main conductor, so that the circuit of the electric motor is closed through the rails, the frame, axles, and wheels of the vehicle on the one hand and through metallic traveling contact-makers insulated from the vehicles and acting successively on the several stationary contact-surfaces on the other hand. These traveling contacts are arranged in the lower part of the vehicle in a suitable position for making contact with the stationary contact-making devices and are electrically connected together. Their number and arrangement are so regulated that there is always one of such contacts in communication with one of the stationary contact-surfaces supplying the current.

The principle of the action is as follows, viz: When the front contact-maker on the vehicle, owing to the movement of the latter, comes in contact with one of the stationary contact-surfaces it communicates to this contact-surface the current proceeding from the preceding contact-surface. Now, as this contact is electrically connected to the distributer by its wire the current is enabled to act upon an electromagnet in the distributer of considerable electrical resistance which closes the circuit and establishes direct communication between the main conductor and the second contact-surface. From this moment this second contact-surface alone supplies the motor until the next contact-surface is reached; but when the vehicle does not require any current for its propulsion, as in descending an incline, for example, these contact-surfaces are nevertheless automatically and successively put in communication with the main conductor. This result, which is of the greatest importance, distinguishes electric railways, when improved according to this invention, from all other systems heretofore constructed in which the line is divided into sections. The automatic distributers are arranged at intervals along the line, being placed in suitable structures, or they may be arranged underground. Their construction and the distances between them may be modified, according to circumstances, without affecting the principles of their action.

In order that our said invention may be fully understood, we shall now proceed more particularly to describe the same, and for that purpose shall refer to the several figures on the annexed sheets of drawings, the same letters of reference indicating corresponding parts in all the figures.

Figure 1 of the accompanying drawings illustrates in plan a portion of a double line of rails for a street-tramway divided into sections and arranged according to this invention. Fig. 2 represents the line in transverse section, the section being taken along the line 1 2, Fig. 1. Fig. 3 represents a similar section taken on the line 3 4, Fig. 1. Fig. 4 is a diagram illustrating in plan the arrangement of the electrical connections on the line and shows how each section is connected to the corresponding distributer. Fig. 5 represents in elevation a car or vehicle provided with the traveling contact-makers employed in carrying out this invention. Fig. 6, drawn to a larger scale, illustrates one of the said contact-makers in side elevation; and Fig. 7 illustrates in transverse vertical section a conduit or receptacle composed of compressed asphalt for the reception of the electrical conductors. Figs. 8 and 9 represent in vertical section and in plan, respectively, an automatic distributer, constructed according to this invention, for controlling the supply of current to the motors. Fig. 10 represents this apparatus viewed on the under side or from below, and Fig. 11 is a similar view of an electromagnet and parts connected therewith in the interior of the said apparatus. Fig. 12 is a view of a ratchet-wheel and pawl, and Figs. 13 and 14 are details of the mechanism hereinafter referred to. Figs. 15 and 16 illustrate the front and back or upper and lower sides of a distributer arranged for working the traffic in either direction, and Fig. 17 represents this apparatus in transverse section. Figs. 18 and 19 are diagrams illustrating the action of this distributer, as hereinafter described. Fig. 20 is a bottom plan, and Fig. 21 a sectional view of a distributer provided with a motor in place of the weight shown in Fig. 8. Figs. $21^a$ and $21^b$ are diagrams hereinafter referred to. Figs. 22 to 24 are enlarged detail views of the switch shown in Fig. 16. Figs. 25, 26, and 27 are enlarged views of a detail hereinafter mentioned.

Referring to Figs. 1 to 6 of the drawings, the line is provided with rails A arranged parallel to one another at a suitable distance apart. Between the two tracks, or in the middle of each track, there are provided stationary contact-surfaces B composed of metal plates or bars, Figs. 1 and 2, about two meters in length, for example, and situated at intervals of about six to eight meters, being a distance equal to the length of the cars or vehicles traveling on the line. The stationary contacts are electrically connected, independently of one another, with automatic distributers $C'$ $C^2$, as represented in the diagram, Fig. 4, arranged along the line in suitable structures or in the underground passage Z, Fig. 3, provided for the reception of the electrical conductors, each distributer being connected with a suitable number of contact-surfaces on the line, say eleven, for example, as in the arrangement illustrated in the drawings. The main conductor $x$, Fig. 4, the branches proceeding from this to the automatic distributers or switches, and the feed-wires leading to the contact-surfaces along the line may conveniently be carried in a conduit or conduits made up of a series of blocks 26, such as illustrated in cross-section in Fig. 7, and which are let into the ground, Figs. 1 and 2. The main conductor is shown as supported upon insulators 25 in a side chamber in the conduit-blocks, while in a similar chamber on the other side of these conduit-blocks the other wires are carried, and the two side chambers are closed by covers 27.

The vehicles traveling on the line or track are provided at the lower part, either at the center or at the side, in a suitable position for acting upon the stationary contacts B, with four or other suitable number of traveling contact-makers D, Fig. 5 and enlarged detail Fig. 6, the said contact-makers being electrically connected together.

The general arrangement of the improved electric railway or tramway having now been explained, the details of the construction of the several constituent parts will be understood by the aid of the following description.

The traveling contact-makers D may be of any suitable construction, those shown in Fig. 6 being composed of two pivoted arms $w$ $w$, acted upon by a spring $w'$. Each of the distributers $C'$ $C^2$, Fig. 4, being constructed as illustrated in detail in Figs. 8 to 14, for example, is, in general, a rotary switch and is provided with an electromagnet $c$, which operates to permit the supply of eleven contact-surfaces B in turn numbered 1 to 12, in Fig. 4, the last or twelfth contact of each series forming the first contact in the succeeding series. The wires proceeding from the distributer are connected to the latter by twelve terminals or clamps marked $t'$ to $t^{12}$, insulated from one another and arranged in a circle, being attached to an insulating-ring S, attached to a suitable frame or casing $f$. The electromagnet $c$ is provided with an armature $ar$ carrying a catch or tooth $cl$, Figs. 8 and 11, capable of engaging with notches in the periphery of a wheel $r$. This catch may be made slightly yielding in a direction tangential to the circumference of the notched wheel $r$, (with which the catch engages when the armature is released, as hereinafter explained,) in order to permit of an easier working in the locking action of the catch and to prevent breakage from too great rigidity of the parts. For this purpose the catch may be pivoted to the armature, as shown in Figs. 25, 26, and 27, and normally held in a central or vertical position by springs 30, acting equally on opposite sides of the catch. These springs allow the catch to yield in the desired direction to an extent limited by the size of the slot in the top plate 31, through which the catch projects. An insulating-disk $d$ is attached to the wheel $r$ and carries on its upper side two copper rings $d'$ $d^2$, Figs. 8, 9, 13, and 14. The ring $d'$ is provided with a radial contact-making arm $m'$, and the ring $d^2$ is likewise provided with a similar arm $m$, the said arms being so arranged as to form an angle of about thirty degrees with one another, so that they may be simultaneously placed upon two consecutive terminals of the series of terminals $t'$ $t^{12}$. The terminal $t^{12}$ is made shorter than the others, as shown in Fig. 13, so that while it lies in the path of the arm $m$ it is beyond reach of the arm $m'$, the latter when directed to this terminal being received upon a plate $t^0$, Figs. 9 and 13, to which no wire is connected. The arm $m'$ is made of sufficient width to enable it to bridge over the intervals between the terminals at the lower part of the latter. The arm $m$ on the other hand, being longer than the arm $m'$, slides over the upper part of the terminals, Fig. 4, which is farther away from the center or axis of the distributer than is the lower part. This arm is made narrow, so that it leaves one terminal before it has completed an arc of thirty degrees and made contact with the next terminal.

A central vertical spindle or axis $c'$, carrying the wheel $r$, provided with twelve notches, the disk $d$, and the rings $d'$ $d^2$, hereinbefore referred to, is actuated by a weight $p$, Fig. 8, which tends to rotate it in the direction of the hands of a watch by the intervention of two bevel-wheels $e$ and $e'$, the latter being fixed upon a spindle to which is attached a drum or barrel $p'$ on which the cord supporting the weight $p$ is wound. The annular plate or ring S, supporting the twelve terminals $t'$ $t^{12}$, is carried by a frame $f$, to which are attached the electromagnet $c$ with its armature $ar$ and the catch $cl$, and also two insulated terminals $b'$ $b^2$, provided with spring contacts or rubbers $r'$ $r^2$, through which the current passes to the two intermittently-rotating rings $d'$ and $d^2$. By means of these arrangements the current from the main conductor $x$, Fig. 4, is permanently connected with the ring $d'$ through the terminal $b'$, Fig. 8, and spring $r'$. In like manner the wire supplying the current to the electromagnet $c$ is connected to the ring $d^2$ through the terminal $b^2$ and spring $r^2$, the fine wire proceeding from the electromagnet being connected with the rails A, as indicated in Fig. 4, which act as return-conductors.

In the diagram Fig. 4 the vehicle V is represented as being supplied with current from a contact-surface 8, connected to the terminal $t^8$ of the distributer C' on the left hand in the drawings. The arm $m'$ is placed upon this terminal $t^8$ and the arm $m$ is placed upon the terminal $t^9$. The vehicle V is assumed to be traveling in the direction indicated by the arrow, and when the front contact-maker D', carried by the said vehicle, comes in contact with the stationary contact surface 9 it supplies current to the latter, and consequently to the electromagnet $c$, through the terminal $t^9$, ring $d^2$, spring $r^2$, and terminal $b^2$. This magnet then attracts its armature $ar$, and by disengaging the catch or tooth $cl$ from the notch in the wheel $r$ enables the rotating parts of the apparatus carrying the arms $m$ $m'$ to describe one-twelfth of a revolution. When the arm $m$ leaves the terminal $t^9$, the supply of current to the electromagnet $c$ is cut off and the catch $cl$ re-engages with the wheel $r$ and arrests the rotary motion of the latter and of the parts connected therewith. After the aforesaid fraction of a revolution, the arm $m'$ stops upon the terminal $t^9$ and the arm $m$ is placed upon the terminal $t^{10}$. These movements are repeated as the vehicle advances until the front traveling contact-maker D' comes in contact with the stationary contact-surface $l$ of the series connected with the second distributer $C^2$. The last contact-surface 12 of the first distributer C' and the first contact-surface $l$ of the second distributer $C^2$ are united in one and are connected with the terminal $t^{12}$ of the first distributer and also with the terminal $t'$ of the second distributer, so that the current is caused to pass in the electromagnet $c$ of both distributers simultaneously, and the contact-making arms $m$ $m'$ in both apparatus are actuated at the same time and describe one-twelfth of a revolution. This rotary motion causes the first distributer to be thrown out of action as its arm $m'$ now bears upon the insulated part $t^0$ of the terminal $t^{12}$, being a part which is not connected with the wire. The second distributer, situated on the right hand in Fig. 4, now comes into action and causes the current to pass to the several contact-surfaces in succession in the same way as the first contact-maker, hereinbefore described, the arm $m'$ on the said second distributer sliding, in the first place, over the terminal $t'$ and directing the current to the contact-surface and afterward to the other contact-surfaces, so in succession until the vehicle makes contact with the first contact-surface of the succeeding distributer.

The modified construction of the distributer illustrated in Figs. 15, 16, and 17 comprises an automatic arrangement for reversing the movement, whereby it is enabled to be employed with vehicles traveling in either direction or backward and forward alternately. In this case the intermittently-rotating notched wheel controlled by the electromagnet is provided, in addition to the rings $d'$ and $d^2$, with a third ring $d^3$, provided with an arm $m^2$, Fig. 15. The three arms $m$ $m'$ $m^2$ bear upon three consecutive terminals, and the arm $m'$ is preceded either by the arm $m$ or the arm $m^2$, according to the direction in which it is rotated. The arm $m'$ is split in order to obtain two independent points of contact and thus insure a good contact simultaneously on the two successive contact-pieces during the passage from one to the other. Two bevel-wheels $e'$ and $e^2$ are fixed upon one shaft or spindle $y$, likewise carrying a drum $p'$, connected to a weight, not shown in the drawings, such as the weight $p$ employed in the arrangement hereinbefore described. As shown in Figs. 12 and 16, there is a pawl-and-ratchet connection between the shaft $y$ and beveled wheel $e'$ to enable the cord carrying the weight to be wound without rotating the gears when the bevel-wheels $e$ and $e'$ are in engagement. A circular or disk-shaped armature $q'$, Fig. 16, is likewise fixed on the spindle $y$. The bevel-wheels $e'$ $e^2$ are alternately caused to gear with the pinion $e$ on the rotary spindle $c'$ by means of two electromagnets $q$, acting momentarily at the required intervals and in opposite directions on the armature $q'$, so as to shift the spindle $y$ in the direction of its length and cause the wheel $e'$ or the wheel $e^2$ to gear with the wheel $e$. The spindle $y$ also carries a collar $h$, engaging by means of two pins $h'$ with arms on the forked lower end of a lever $lv$, Fig. 17, oscillating on an axis $o$ on the fixed part of the frame. The upper end of this lever lies between two pins $t^{20}$ $t^{21}$ on a switch-plate $cm$, which can be oscillated upon an axis $z$. This switch-plate carries three electrical contact-fingers $l'$ $l^2$ $l^3$, insulated from each other. When the switch-plate $cm$ is in one extreme position, these fingers make contact with one set of fixed contacts on an insulating part of the distributer-frame, and when the switch-plate is in the other extreme position they bear upon another set of contacts, as will be explained more fully in connection with diagrams Figs. 18 and 19. A spring $r^3$ connects the lever $lv$ with a fixed part of the frame below the pivot $o$ in such a way as to make it act as a snap-switch and tend to retain the lever in either of its extreme positions. The different positions of the switch and the lever will be understood more fully on reference to Figs. 22, 23, and 24. Figs. 22 and 24 show the switch-lever and switch-plate in their two extreme positions, or positions of rest, while Fig. 23 shows the lever in course of being moved over from the position shown in Fig. 22 to that shown in Fig. 24, when, by striking the pin $t^{21}$, the lever is about to throw the switch-plate over. When the current comes from a reversal of the running of the car, as described hereinafter, the electromagnet $q$ on the left, acting on the armature $q'$, draws the lever $lv$ over and throws the switch from the position Fig. 22 to that of Fig. 24; but in the first part of this movement the switch-plate $cm$ remains immovable, the lever $lv$ moving freely in the space between the two pins $t^{20}$ and $t^{21}$—that is, from the position shown in Fig. 22 to the position shown in Fig. 23. The second part of the movement of the lever $lv$ moves the circular switch $cm$ into the position shown in Fig. 24. The spring $r^3$, acting on the lever $lv$, gives a quick or snap movement to the switch and holds the lever in either extreme position.

With the exception of the parts specially referred to the device represented in Figs. 15, 16, and 17 is the same as that represented in Figs. 8 to 14. The course of the current in this modification of the distributer for working the traffic in both directions is explained by the diagrams Figs. 18 and 19. In Fig. 18 the vehicle is assumed to be supplied with current through the terminal $t^8$ and to be traveling in the direction of the arrow. When the front traveling contact-maker on the vehicle makes contact with the stationary contact-surface 9, the latter supplies current through the arm $m$ and switch $l'$ to an electromagnet $c$, which, by attracting its armature $ar$, causes the arm $m$ to be shifted (as described with reference to Figs. 8, 9, and 11) from the terminal $t^9$ to the terminal $t^{10}$, the arm $m'$ onto $t^9$, and the arm $m^2$ onto $t^8$. At the same time it momentarily breaks contact at $i'$ and makes contact at $i^2$ by means of an arm $br$, carried by the armature $ar$, acting upon the said spring-contacts within the casing of the distributer, as illustrated in Fig. 21 and indicated by the diagram Fig. 18.

It is necessary to provide for working under two different conditions, according as the vehicle is traveling at normal speed or at a reduced speed. In the first case the traveling contact-maker at the rear end of the vehicle $D^4$, Fig. 5, ceases to communicate with the terminal $t^8$ before the arm $m^2$ has made contact with the said terminal, in which case the action is the same as in the distributer hereinbefore described; but in the second place—namely, that of a vehicle traveling at a reduced speed—the arm $m^2$ makes contact with the terminal $t^8$ before the communication with the rear traveling contact-maker $D^4$ has ceased, so that a current passes from $m^2$ through $l^2$ and the contact $i^2$ to a solenoid or electromagnet $k$, which causes contact to be made at $i^3$ and breaks contact at $i^4$. This electromagnet $k$, like the magnet $c$, may be mounted in the casing of the distributer and have an arm acting upon the said spring-contacts $i^3$ $i^4$ as the arm $br$ acts upon the spring-contacts $i'$ $i^2$. In the meantime a catch, such as the catch $cl$, Fig. 11, is disengaged from the notch in the locking-wheel $r$. Contact is made at $i'$; but the solenoid $k$ continues to be excited until the bridge or connection between the two consecutive contact-surfaces $b^8$ and $b^9$ is broken, being supplied with current up to that time through the contact $i^3$. From this moment and during the whole of the time in which the vehicle is supplied with current through this terminal $t^9$ no current circulates in the interior of the apparatus, except that supplied to the electromotor and passing directly from a terminal, such as the terminal $b'$, Fig. 8, to the arm $m'$. Now if the vehicle travels in the opposite direction, as indicated by the arrow in Fig. 19, it momentarily bridges over the interval between $B^8$ and $B^7$, Fig. 18, and the current passes through the arm $m^2$, switch $l^2$, catches $i'$ and $i^4$, and switch $l^3$ to the reversing-electromagnet, being the magnet $q$, situated on the left hand in the drawings. The toothed gearing $e'$ $e^2$ is shifted immediately, so as to reverse the rotary motion, the switch-plate $cm$, controlling the switches $l'$ $l^2$ $l^3$, being likewise moved over to the position indicated in Fig. 19, and from this time no current passes in this reversing-electromagnet; but its armature $q'$ remains in the attracted position in which it is maintained by the spring $r^3$, hereinbefore referred to. On the other hand the electromagnet $c$ unlocks the mechanism, being maintained in circuit by $m^2$ $l'$, and allows the arms $m'$ to move back to the terminal $t^8$. The vehicle continuing to travel in the same direction as indicated by the arrow in Fig. 19, the distributer continues to act as hereinbefore described. The same operations are repeated in case the vehicle, after traveling for a distance corresponding to several of the terminals, recommences to travel in the original direction.

It is evident that a spring or an electric motor or other source of power may be employed for rotating the spindle $c'$ of the distributer in place of the weight $p$, Fig. 8. When an electric motor is employed for this purpose, it is not necessary to cause power to be constantly exerted upon the mechanism of the distributer, and the electric motor may be so arranged as to come into action at the time when the wheel is unlocked and cease immediately after the partial rotation has been performed.

Figs. 20 and 21 show a distributer provided with an electric motor. This motor is composed of two inducing-bobbins $i\ i$ and an armature G, keyed with its commutator on the shaft $c'$ of the distributer to turn between the pole-pieces P P. This motor wound in series can be supplied in two different ways to produce the partial rotations of the distributer. In diagram Fig. 21$^a$ this electromotor is shown connected up in series with the electromagnet $c$, and receives its current at the same time as the electromagnet $c$, to cease as soon as the finger passes off the contact which has produced the disengagement of the notch $cl$ from the toothed wheel $r$. The reversing-switch $in$ with the connected switch $cm$ is shown as in the position when the distributer is to be intermittently rotated in the direction of the arrow, Fig. 21$^a$. The current then entering at B' passes to the ring $d'$, contact-finger $m'$ to the surface-contact with which the shoes on the car make contact, thence back through the finger $m$, ring $d^2$, contact B$^2$, switch $cm$, electromagnet $c$, and through one arm of the switch $in$ to the field-magnet coils of the motor, thence through the armature-coils to the ground T. When the distributer is to rotate in the opposite direction, owing to the reverse movement of the car, the switches $in$ and $cm$ will be thrown over together to the right, and the return-circuit from the car will then be through the contact-finger $m^2$, ring $d^3$, contact B$^3$, electromagnet $c$, and through the field-magnet coils of the motor, but in the opposite direction from that last described, owing to the changed position of the switch $in$, and thence through the armature-coils to the ground, as before.

In Fig. 21$^b$ the motor is supplied with current through the medium of a contact K, closed by the arm $br$ of the armature $ar$, when the latter is attracted by the electromagnet $c$. The current is then supplied to the motor on the disengagement of the notch $cl$ from the wheel $r$ until this notch re-engages with the succeeding tooth of that wheel—that is to say, during the entire time of the partial rotation necessary and only during this rotation. In this diagram the switches $cm$ and $in$ are shown in position when the distributer is to be intermittently rotated in a direction contrary to that described in connection with the diagram Fig. 21$^a$. In this case the return-circuit from the car is through the contact-finger $m^2$, ring $d^3$, contact B$^3$, switch $cm$, electromagnet $c$, thence to the ground at T'. At the same time a branch circuit from B' (being closed at K by the upward movement of the arm $br$ on the attraction of the armature $ar$ by the electromagnet $c$) passes through the switch $in$ and the motor to the ground at T. When the switches $in$ and $cm$ are thrown over together to the right, the reverse movements of the motor and distributer will be obtained, as will be readily understood without description. The currents controlled by the contacts or switches $i'\ i^2\ i^3\ i^4$ being relatively weak (a few hundredths of an ampère) the dimensions of these contacts may be very small, especially as no sparks can be produced at these points, as the opening of any of these switches does not produce any difference of potential between the parts previously placed in communication.

The principal advantages of this improved system of electric traction or propulsion are as follows: It enables the cost of the feeders or conductors for supplying the current to the motors to be reduced to a minimum because, according to this improved system, these feeders may be reduced to elements of contact, the relative distances between which are regulated by the length of the train, so that the number of contacts and consequently the number of wires for supplying them with currents diminishes in proportion as the trains increase in length. An interval of more than one hundred meters, for example, may be left between two contacts, whereas in any other system the length of the line on which the current is taken is frequently equal to that of the track itself.

With regard to the contacts which receive the current in an intermittent manner, whether for actuating the electromagnet and the distributer or for supplying the motor propelling the vehicle, it is found that owing to the automatic distribution which limits the time during which the currents are in operation in either direction the said currents are prevented from producing any electrolytic effect. On the other hand the electric current employed to produce the electrolytic action, not circulating except for a period difficult to measure, in practice it results that the loss of energy involved in releasing the mechanism—that is to say, for placing the motor in direct communication with the main conductor—is almost $nil$, being a result which is not obtained on any analogous electrical railway heretofore constructed, in which the apparatus for the distribution of the currents consumes or absorbs almost as much energy as the propulsion itself. It results from this important fact that the electrical work done by means of the underground conductors has, owing to the automatic distribution hereinbefore described, all the advantages of the aerial lines, which are regarded as the best heretofore employed, and does not present the disadvantage accompanying aerial lines of necessitating exposure of the conductors supported upon posts or buildings and which constitutes a serious difficulty in the construction of urban electric railways.

We claim as our invention—

1. An electric railway system, having a series of spaced contact surfaces, a main conductor to supply current to said surfaces in succession, in combination with an automatic distributer having terminals connected to said surfaces, and means for automatically bringing said contact surfaces successively into electrical connection with the main conductor one at a time, and locking such connection until the succeeding contact surface is reached by the car, all substantially as described.

2. A distributer for electric railways having a series of insulated terminals to be connected up with the contacts along the line, in combination with a wheel carrying a contact to make contact with the said terminals, means for turning the said wheel and devices controlled from the traveling car for automatically releasing and locking the said wheel.

3. A distributer for electric railways having a series of insulated terminals to be connected up with the contacts along the line, in combination with a wheel carrying a contact to make contact with the said terminals one at a time, means for turning the said wheel, and electro-magnetic devices adapted to be thrown into and out of circuit by the vehicle in its movements to release and lock the wheel.

4. A distributer for electric railways having a series of insulated terminals to be connected up with the contacts along the line, in combination with a toothed contact wheel to make contact with the said terminals, successively, an electromagnet adapted to be thrown in and out of circuit by the vehicle in its travel, an armature for the said electromagnet and provided with a catch adapted to engage the toothed wheel and means for turning the latter, all substantially as and for the purposes set forth.

5. A distributer for electric railways having a series of insulated terminals to be connected up with the contacts along the line, in combination with a toothed wheel carrying two contacts of which the second is to supply current to the motors on the cars through the line contacts, means for rotating the said wheel, an electro-magnet whose coil is electrically connected in circuit with the first contact on the wheel and an armature for the said electro-magnet, provided with a catch to engage the toothed wheel, all substantially as and for the purposes set forth.

6. A distributer for electric railways having a series of insulated terminals to be connected up with the contacts along the line, in combination with a toothed wheel carrying three contacts, of which the intermediate one is to convey the motive current to the car, means for rotating the said wheel, an electro-magnet and a switch to electrically connect the coil of the electro-magnet through one or other of the two side contacts on the wheel, according to the direction the vehicle is to travel, an armature for the said electro-magnet and devices controlled by the said armature to release and lock the contact carrying wheel, all substantially as and for the purposes set forth.

7. In an automatic distributer for distributing the electric current for the purposes of electric traction or propulsion on railways or tramways, a series of insulated terminals or contact makers such as $t'$ to $t^{12}$ which are respectively placed in electrical communication with the contacts B on the line in combination with arms $m$ and $m'$ the arm $m$ being attached to a ring $d^2$ connected with the terminal $b^2$ and the arm $m'$ being attached to a ring $d'$ connected with the terminal $b'$ the terminal $b'$ being electrically connected with the main conductor, substantially as hereinbefore set forth.

8. In an automatic distributer for distributing the electric current for the purposes of electric traction or propulsion upon railways and tramways, a series of terminals or contact makers such as $t'$ to $t^{12}$, rings $d'$ and $d^2$ provided with arms $m'$ and $m$ and terminals $b'$ and $b^2$, in combination with an electro-magnet $c$ energized by a wire connected to the terminal $b^2$ on the one hand and to the rails A on the other hand and having an armature $ar$ capable of locking a wheel $r$ having a constant tendency to rotate under the influence of two bevel wheels $e\ e'$ and weight $p$ or other force in the manner and for the purpose substantially as hereinbefore set forth.

9. In an automatic distributer for distributing an electric current for the purposes of electric traction or propulsion upon railways and tramways a series of contacts such as $t'$ to $t^{12}$, rings $d'$ and $d^2$, carrying arms $m'$ and $m$ and connected with terminals $b'\ b^2$, in combination with a third ring $d^3$, arm $m^2$, toothed gearing $e$, $e'\ e^2$, a rotary spindle $c'$, a circular armature $q'$, two electro magnets $q$, a spring $r^3$, a wheel $r$, a drum $p'$ and a weight or other motor in the manner and for the purpose substantially as hereinbefore set forth.

10. In an automatic distributer for distributing the electric current for the purposes of electric traction or propulsion on railways and tramways, the combination of a series of terminals or contacts such as $t'$ to $t^{12}$, rings $d'$ $d^2$ $d^3$ having arms $m\ m'$, bevel wheels $e\ e'\ e^2$, a circular armature $q'$, two electro-magnets $q$, a spring $r^3$ with a lever $lv$, a switch $cm$ switch arms or contact makers $l'$ $l^2$ $l^3$, electro magnets $c$ and $k$ and their armatures controlling contacts $i'$ $i^2$ $i^3$ $i^4$ in the manner and for the purpose substantially as hereinbefore set forth.

In testimony whereof we have signed our names to this specification in the presence of two subscribing witnesses.

JEAN CLARET.
   OLIVIER WUILLEUMIER.

Witnesses:
 G. GRENIER,
 ECURONIS.